US011122333B2

(12) United States Patent
Li et al.

(10) Patent No.: US 11,122,333 B2
(45) Date of Patent: Sep. 14, 2021

(54) USER FEATURE GENERATION METHOD AND APPARATUS, DEVICE, AND COMPUTER-READABLE STORAGE MEDIUM

(71) Applicant: Tencent Technology (Shenzhen) Company Limited, Shenzhen (CN)

(72) Inventors: Xuesong Li, Shenzhen (CN); Liangni Lu, Shenzhen (CN); Yuan Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/991,983

(22) Filed: Aug. 12, 2020

(65) Prior Publication Data
US 2020/0374589 A1 Nov. 26, 2020

Related U.S. Application Data

(63) Continuation of application No. PCT/CN2019/090559, filed on Jun. 10, 2019.

(30) Foreign Application Priority Data

Jul. 4, 2018 (CN) .......................... 201810724443.3

(51) Int. Cl.
*H04N 21/466* (2011.01)
*H04N 21/45* (2011.01)

(52) U.S. Cl.
CPC ..... *H04N 21/4668* (2013.01); *H04N 21/4532* (2013.01)

(58) Field of Classification Search
CPC ........... H04N 21/4668; H04N 21/4532; H04N 21/44222; H04N 21/6582; H04N 21/4666;
(Continued)

(56) References Cited

U.S. PATENT DOCUMENTS

2002/0042923 A1* 4/2002 Asmussen ............ H04N 7/0887
725/92
2006/0136496 A1* 6/2006 Ohashi ............... H04N 21/8352
(Continued)

FOREIGN PATENT DOCUMENTS

CN 105677715 A 6/2016
CN 106228386 A 12/2016
(Continued)

OTHER PUBLICATIONS

Tencent Technology, ISR, PCT/CN2019/090559, Sep. 11, 2019, 2 pgs.
(Continued)

*Primary Examiner* — Jefferey F Harold
*Assistant Examiner* — Timothy R Newlin
(74) *Attorney, Agent, or Firm* — Morgan, Lewis & Bockius LLP

(57) ABSTRACT

A user feature generation method is performed at a server, the method including: acquiring n groups of timing correspondences between target videos and corresponding user accounts, each group of timing correspondences comprising user accounts that have viewed a respective target video, the user accounts being sorted according to their corresponding viewing timestamps, n being a positive integer; obtaining a word-embedding matrix by mapping the n groups of timing correspondences into the word-embedding matrix, the word-embedding matrix comprising a word vector corresponding to each user account; training the word-embedding matrix by using a loss function, the loss function being used for defining a similarity relationship between the user accounts according to a degree of similarity between their respective watch histories; and determining a word vector corresponding to each user account in the trained word-embedding matrix as a user feature of the user account.

20 Claims, 10 Drawing Sheets

(58) Field of Classification Search
CPC ............ H04N 21/252; H04N 21/8352; H04N 21/251; H04N 21/25891; G06F 16/75; G06F 16/78; G06K 9/6217
See application file for complete search history.

(56) References Cited

U.S. PATENT DOCUMENTS

| | | | | |
|---|---|---|---|---|
| 2008/0052171 | A1* | 2/2008 | Eldering | G06Q 30/0268 705/14.53 |
| 2008/0319973 | A1* | 12/2008 | Thambiratnam | G06F 16/313 |
| 2010/0125544 | A1* | 5/2010 | Lee | H04N 7/17318 706/54 |
| 2010/0169343 | A1* | 7/2010 | Kenedy | G06F 16/9535 707/758 |
| 2011/0185384 | A1* | 7/2011 | Wang | G06Q 30/0255 725/34 |
| 2013/0139191 | A1* | 5/2013 | Ren | H04N 21/6582 725/1 |
| 2013/0262478 | A1* | 10/2013 | Kemp | G06Q 30/02 707/748 |
| 2017/0024391 | A1* | 1/2017 | Steck | G06F 16/337 |
| 2017/0048184 | A1* | 2/2017 | Lewis | H04L 51/10 |
| 2017/0195731 | A1* | 7/2017 | Girlando | H04N 21/4668 |
| 2018/0067939 | A1* | 3/2018 | Thomas | G06Q 30/0204 |
| 2018/0174070 | A1* | 6/2018 | Hoffman | G06T 11/00 |
| 2019/0279231 | A1* | 9/2019 | Ning | G06Q 30/0202 |
| 2020/0036462 | A1* | 1/2020 | Grancharov | H04N 21/2547 |

FOREIGN PATENT DOCUMENTS

| | | |
|---|---|---|
| CN | 106454423 A | 2/2017 |
| CN | 106599226 A | 4/2017 |
| CN | 107977355 A | 5/2018 |
| CN | 108062342 A | 5/2018 |
| CN | 108921221 A | 11/2018 |
| WO | WO 2018112696 A1 | 6/2018 |

OTHER PUBLICATIONS

Tencent Technology, WO, PCT/CN2019/090559, Sep. 11, 2019, 5 pgs.
Tencent Technology, IPRP, PCT/CN2019/090559, Jan. 5, 2021, 6 pgs.
Extended European Search Report, EP19852334.2, dated May 10, 2021, 10 pgs.
Pasquale Lops et al., "Content-based Recommender Systems: State of the Art and Trends", Recommender Systems Handbook, Springer, Boston, MA, Oct. 5, 2010, XP055275313, ISBN: 978-0-387-85820-3, 33 pgs.

* cited by examiner

USER FEATURE GENERATION METHOD AND APPARATUS, DEVICE, AND COMPUTER-READABLE STORAGE MEDIUM

CROSS REFERENCE TO RELATED APPLICATIONS

This application is a continuation application of PCT Patent Application No. PCT/CN2019/090559, entitled "USER FEATURE GENERATING METHOD, DEVICE, AND APPARATUS, AND COMPUTER-READABLE STORAGE MEDIUM" filed on Jun. 10, 2019, which claims priority to Chinese Patent Application No. 201810724443.3, entitled "USER FEATURE GENERATION METHOD AND APPARATUS, DEVICE, AND STORAGE MEDIUM" filed Jul. 4, 2018, all of which are incorporated by reference in their entirety.

FIELD OF THE TECHNOLOGY

This application relates to the field of video recommendation, and in particular, to a user feature generation method and apparatus, a device, and a non-transitory computer-readable storage medium.

BACKGROUND OF THE DISCLOSURE

A video recommendation system is a system used for recommending, to a user according to a watch history and/or a search history of the user, other videos that the user may be interested in. A typical video recommendation system includes a candidate generation model and a sorting model. After a watch history and/or a search history of a user is inputted into the candidate generation model, M recommended videos are obtained. The M recommended videos are inputted into the sorting model. The sorting model sorts the M recommended videos according to degrees of possible interest of the user and then outputs the result to the user. M is a positive integer.

The candidate generation model in the related art is implemented by using a deep neural network (DNN). An input of the DNN includes a user feature of a user, a watch history of the user, and/or a search history of the user. An output includes M recommended videos recommended to the user. The user feature of the user may be obtained by vectorizing attribute information such as age, gender, region, and interest tags of the user.

Because many users do not add attribute information or add incomplete attribute information in a video system, user features cannot be generated for the users by using the foregoing method. A lot of attribute information may be extracted from a social chat system used by a user. However, the user uses a first user account in the video system and uses a second user account in the social chat system. It is very difficult to accurately associate the user accounts in two account systems. An association error leads to an error in an eventually generated user feature. Consequently, a valid user feature cannot be generated for a user with blank, incomplete or incorrect attribute information by using the foregoing generation method.

SUMMARY

Embodiments of this application provide a user feature generation method and apparatus, a device, and a non-transitory computer-readable storage medium.

A user feature generation method is performed by a server and includes:

acquiring n groups of timing correspondences between target videos and corresponding user accounts, each group of timing correspondences comprising user accounts that have viewed a respective target video, the user accounts being sorted according to their corresponding viewing timestamps, n being a positive integer;

obtaining a word-embedding matrix by mapping the n groups of timing correspondences into the word-embedding matrix, the word-embedding matrix comprising a word vector corresponding to each user account;

training the word-embedding matrix by using a loss function, the loss function being used for defining a similarity relationship between the user accounts according to a degree of similarity between their respective watch histories; and determining a word vector corresponding to each user account in the trained word-embedding matrix as a user feature of the user account.

A server is provided, including a processor and memory, the memory storing a plurality of instructions that, when executed by the processor, cause the processor to perform the steps of the foregoing user feature generation method.

A non-transitory computer-readable storage medium is provided, storing a plurality of instructions that, when executed by a processor of a server, cause the server to perform the steps of the foregoing user feature generation method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Exemplary embodiments are described in detail herein, and examples of the exemplary embodiments are shown in the accompanying drawings. When the following descriptions are made with reference to the accompanying drawings, unless indicated otherwise, the same numerals in different accompanying drawings represent same or similar elements. The following implementations described in the following exemplary embodiments do not represent all implementations that are consistent with this application. On the contrary, the implementations are merely examples of apparatuses and methods that are described in detail in the appended claims and are consistent with some aspects of this application.

Embodiments of this application provide a technical solution of extracting a user feature based on a history record of a user. The history record may be at least one of a watch history record and a search history record. This technical solution may be used during the training and use of a neural network model related to a video playback system. Typically, the user-feature may be used for the training and use of a candidate generation model in a video recommendation system or used for the training and use of a sorting model in a video recommendation system.

A typical application scenario includes any of the following scenarios.

Video recommendation scenario:

A video recommendation system is provided with a video library, including a plurality of videos, for example, millions of videos. For a user account, a candidate recommendation set needs to be selected from the video library based on the interest and hobby of the user account. Schematically, the video recommendation system selects the candidate recommendation set from the video library by using a candidate generation model. The candidate generation model may be a DNN-based model. The user feature provided in the embodiments of this application is suitable for use as an input of the candidate generation model for training and use.

Video sorting scenario:

When recommending a plurality of videos in the candidate recommendation set to a user, the video recommendation system sequentially recommends the plurality of videos to the user in a descending order of the probability that the user may take interest. Schematically, the video recommendation system sorts the plurality of videos in the candidate recommendation set by using a sorting model. The sorting model may be a DNN-based neural network model. The user feature provided in the embodiments of this application is suitable for use as an input of the sorting model for training and use.

Figure 1:
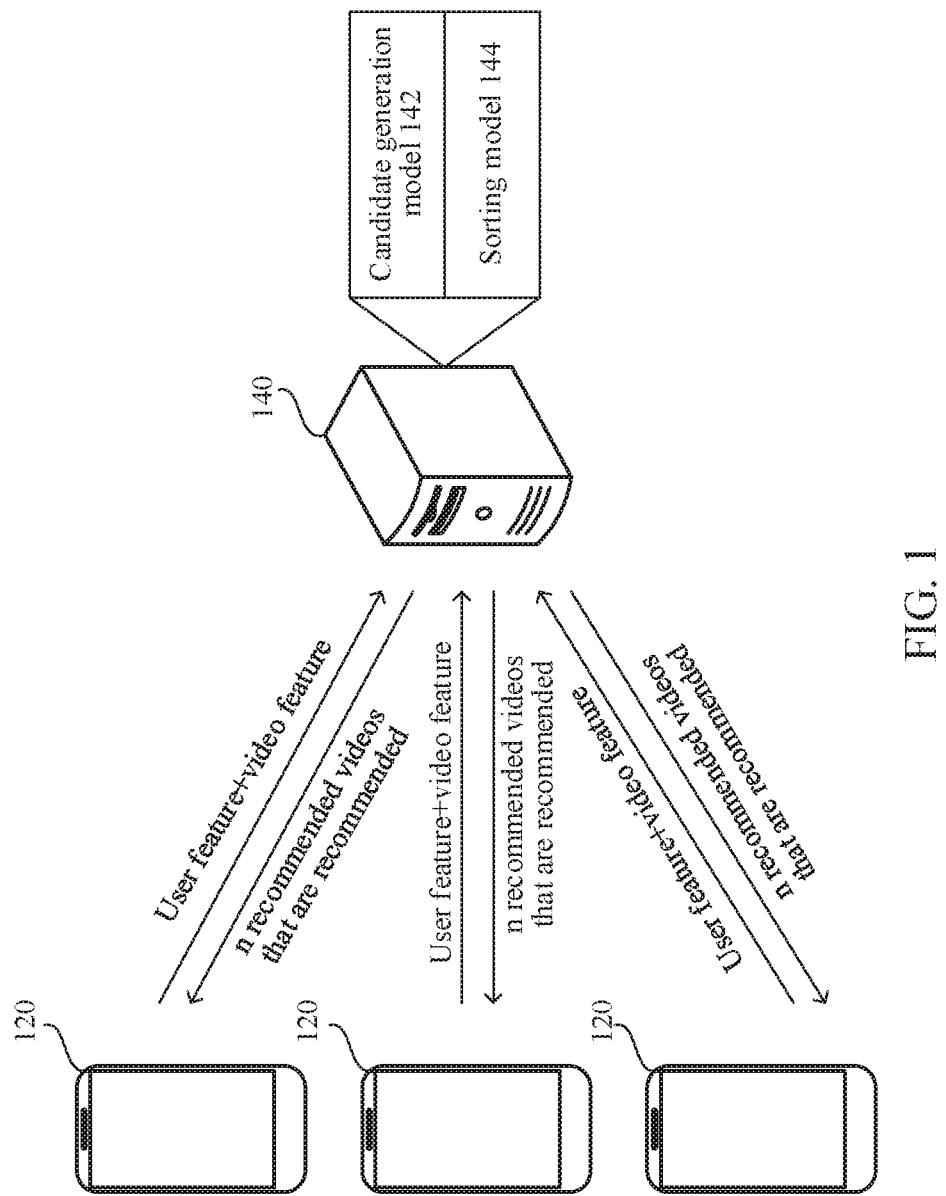
FIG. 1 is a block diagram of a video recommendation system according to an exemplary embodiment of this application.

FIG. 1 is a structural block diagram of a video recommendation system 100 according to an exemplary embodiment of this application. The video recommendation system 100 includes a terminal 120 and a server 140.

The terminal 120 is an electronic device used by a user. The electronic device has a video playback capability. The electronic device may be any one of a smartphone, a tablet computer, an MP3, an MP4, a palmtop computer, a notebook computer, and a desktop computer. On the electronic device, an application program is installed or run. The application program has a video playback function. Optionally, the application program is at least one of an online video client, a short video client, a video aggregator client, a user-shared-video client. A user logs on to a user account in the application program. The user account is used for uniquely identifying the user among a plurality of users.

The terminal 120 is connected to the server 140 by a wired network or a wireless network.

The server 140 is a server, a server cluster including a plurality of servers, a cloud computing center or a virtual computing center. The server 140 may be a server for video recommendation. The server 140 is configured to acquire a personalized feature of a user account, analyze a watch preference of a user according to the personalized feature of the user account, and recommend, according to the watch preference, a target video that the user may be interested in. A candidate generation model 142 and a sorting model 144 are run on the server 140. The candidate generation model 142 is used for choosing hundreds of candidate video sets from a large number of video sets. The sorting model 144 is used for sorting the candidate video sets in a personalized manner.

Optionally, the candidate generation model 142 may be a DNN-based neural network model. In a case that a user account requires video recommendation, the server 140 is configured to input a user feature and a video feature that correspond to the user account into the candidate generation model 142. The candidate generation model 142 outputs n target videos that the user account may be interested in and a watch probability of each target video. The watch probability is a predicted probability that the user account clicks and watches the target video.

Optionally, the user feature is used for indicating a personalized feature of the user. In the related art, the user feature is obtained by vectorizing attribute features such as age, gender, occupation, and interest tags of the user. However, in actual cases, there are problems in two aspects in the collection of attribute features. In one problem, in a mobile application with a large quantity of daily active users, a massive number of users are involved, leading to relatively high collection costs, and an offline task is susceptible to a relatively high risk of delay. In the other problem, a user account used in the collection of a playback sequence and a user account in attribute information (from another social networking system) may belong to different systems. Consequently, one user account needs to be associated with the other user account. It is relatively difficult to accurately associate user accounts in two account systems. Attribute features that can be acquired in a video playback system are limited. A relatively long time and relatively high costs need to be consumed to collect and generate user features. In some embodiments of this application, a user feature is generated based on at least one of a watch history record and a search history record of a user. In such embodiments, none or a few of attribute features such as age, gender, occupation, and interest tags may be used.

Optionally, the video feature is used for indicating an attribute feature of at least one of a video that the user has watched and a video that the user has searched for. In some embodiments, a first vector is obtained by performing first vectorization on an identifier of a video that the user account has previously watched. A second vector is obtained by performing second vectorization on an identifier of a video that the user account has previously searched for. The video feature of the user account is obtained by superimposing the first vector and the second vector. A specific extraction manner of video features is not limited in the embodiments of this application.

This implementation environment is merely used for schematic description. The method embodiments below may be alternatively performed by another server and are not limited to the foregoing server 140.

In the embodiments of this application, based on sequences of videos that users have previously watched/searched for, the users are mapped to different word vectors by using a word vector method. The word vectors are further used as user features. In such a process, a user feature may be generated without using attribute features such as age, gender, occupation, and interest tags.

Figure 2:
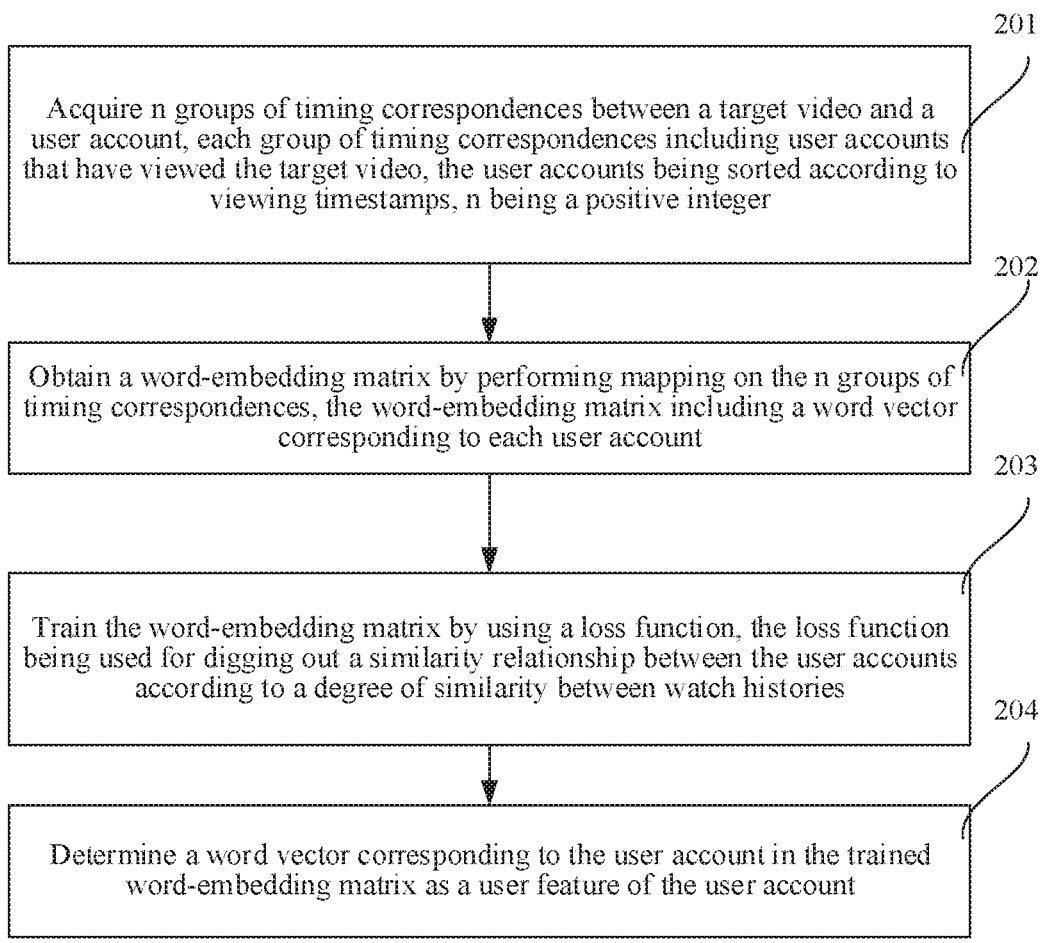
FIG. 2 is a flowchart of a user feature generation method according to an exemplary embodiment of this application.

FIG. 2 is a flowchart of a user feature generation method according to an exemplary embodiment of this application. An example in which the method is performed by the server in FIG. 1 is used for describing this embodiment. The method includes the following steps.

Step 201. Acquire n groups of timing correspondences between a target video and a user account, each group of timing correspondences including user accounts that have viewed the target video, the user accounts being sorted according to viewing timestamps.

The case of having viewed the target video includes at least one of the case of having watched the target video and the case of having searched for the target video. Correspondingly, the viewing timestamp includes at least one of a watch timestamp and a search timestamp.

A database in the server stores a video-playback flow record of videos that user accounts have watched. The video-playback flow record stores video identifiers of previously watched videos and a watch timestamp of each video identifier.

The database in the server further stores a video-search flow record of videos that user accounts have searched for. The video-search flow record stores video identifiers of previously searched-for videos and a search timestamp of each video identifier.

An example that is based on a video watch history is used. The server extracts a timing correspondence between an "item" and a "user" from a video-playback flow record. The "item" is a video identifier of a target video, and the "user" is a user identifier of a user that has watched the target video. Each timing correspondence corresponds to one target video and user accounts that have watched the target video. In addition, the user accounts in the correspondence are sorted according to watch timestamps of the time at which the user accounts watch the target video.

The server extracts a plurality of groups of timing correspondences between an "item" and a "user". The plurality of groups of timing correspondences may be considered as a "document set".

Step 202. Obtain a word-embedding matrix by performing mapping on the n groups of timing correspondences, the word-embedding matrix including a word vector corresponding to each user account.

The word-embedding matrix is a matrix obtained by performing mapping on the n groups of timing correspondences in a word vector mapping manner. Each row (or each column) of the word vector corresponds to one user account. Values in each row of the matrix form a word vector corresponding to the user account.

Step 203. Train the word-embedding matrix by using a loss function, the loss function being used for digging out a similarity relationship between the user accounts according to a degree of similarity between watch histories.

For any two user accounts, when the two user accounts have watched more same (or similar) videos, it indicates that the two user accounts have a higher degree of similarity. To dig out an implicit relationship between user accounts, the server trains the word-embedding matrix by using a loss function, the loss function being used for digging out a similarity relationship between the user accounts according to a degree of similarity between watch histories. Alternatively, the loss function is used for digging out an implicit similarity relationship between the user accounts according to a degree of similarity between watch histories. Alternatively, the loss function is used for digging out an implicit relationship between the user accounts according to a degree of similarity between watch histories.

Optionally, the loss function is a noise-contrastive estimation (NCE) loss function.

Step 204. Determine a word vector corresponding to the user account in the trained word-embedding matrix as a user feature of the user account.

After the word-embedding matrix is trained by using the loss function, when word vectors corresponding to any two user accounts have closer cosine vectors, it indicates that the two user accounts have greater similarity.

The server extracts word vectors from the trained word-embedding matrix. Each word vector is determined as a user feature of a corresponding user account.

In summary, according to the user feature generation method provided in this embodiment, n groups of timing correspondences between a target video and a user account are acquired, a word-embedding matrix is obtained by performing mapping on the n groups of timing correspondences, the word-embedding matrix is trained by using a loss function, and a word vector corresponding to a user account in the trained word-embedding matrix is determined as a user feature of the user account. According to the technical solution of this application, a user feature is extracted based on a history record of a user. The history record may be at least one of a watch history record and a search history record. All the historical data is data automatically generated in a video system. Provided that the user normally uses the video system, the video system continually generates and updates such data without depending on another data source. Therefore, the problem that a valid user feature cannot be generated for a user with blank, incomplete or incorrect attribute information by using a method in the related art can be resolved, and a relatively accurate user feature can be generated for a user using the video system. In addition, the user feature can fully reflect a feature of each user account from the perspective of video watching and is appropriate for use as an input parameter of a neural network model related to a video recommendation system.

In addition, because all the historical data is data automatically generated in the video system without depending on another data source, it is not necessary to associate corresponding accounts in two different account systems, and there is no problem of how to accurately associate corresponding accounts in two different account systems. Therefore, steps of data processing are reduced, and processing resources are saved.

Figure 3:
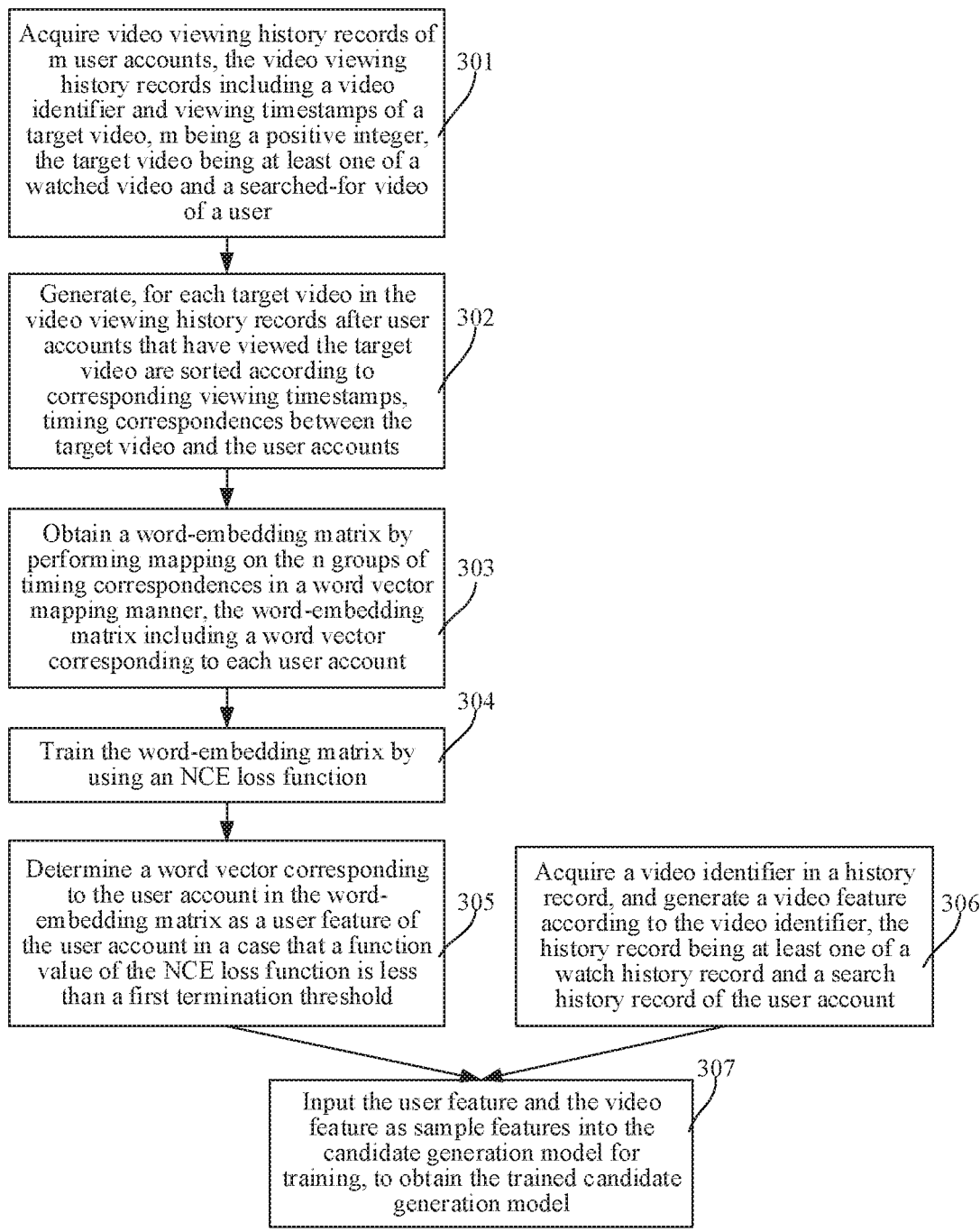
FIG. 3 is a flowchart of a user feature generation method according to an exemplary embodiment of this application.

FIG. 3 is a flowchart of a user feature generation method according to an exemplary embodiment of this application. An example in which the method is performed by the server in FIG. 1 is used for describing this embodiment. The method includes the following steps.

Step 301. Acquire video viewing history records of m user accounts, the video viewing history records including a video identifier and viewing timestamps of a target video, m being a positive integer, the target video being at least one of a watched video and a searched-for video of a user.

The database of the server stores video viewing history records of user accounts. The video viewing history record includes at least one of a video-watch flow record and a video-search flow record. The video-watch flow record includes video identifiers and watch timestamps of target videos that each user account has watched within a historical time period. The video-search flow record includes video identifiers and search timestamps of target videos that each user account has searched within a historical time period.

Optionally, the historical time period is a time period with a preset time length from a recent moment. For example, the historical time period is at least one of last week, last month, last three months, last six months, last year or last three years.

Figure 4:
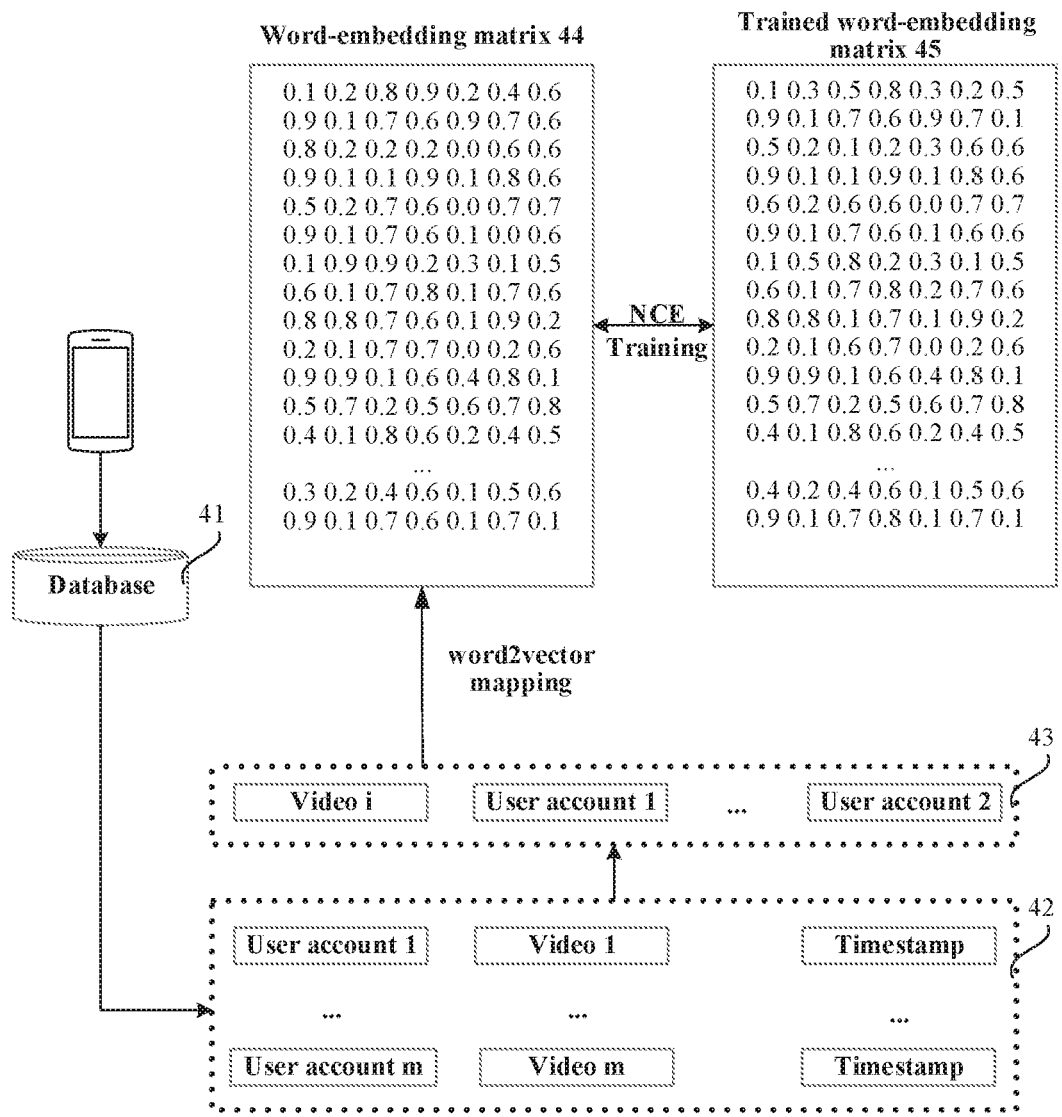
FIG. 4 is a schematic diagram of the principle of a user feature generation method according to another exemplary embodiment of this application.

Referring to FIG. 4, the server obtains a video-watch flow record 42 of m user accounts from a database 41. The video-watch flow record 42 includes: a user account 1, a video 1 that the user account 1 has watched, a watch timestamp of the time at which the user account 1 watches the video 1; a user account 2, a video 2 that the user account 2 has watched, a watch timestamp of the time at which the user account 2 watches the video 2; . . . , a user account m, a video in that the user account in has watched, a watch timestamp of the time at which the user account in watches the video m. m is a positive integer.

Step 302. Generate, for each target video in the video viewing history records after user accounts that have viewed the target video are sorted according to corresponding viewing timestamps, timing correspondences between the target video and the user accounts.

The server generates a timing correspondence between an "item" and a "user" based on a video viewing history record. The "item" is a video identifier of a target video, and the "user" is a user identifier of a user that has viewed the target video. Each group of timing correspondences includes a video identifier of one target video and user identifiers of users that have viewed the target video. In some embodiments, a plurality of user identifiers in one group of timing correspondences are sorted in a time order of viewing timestamps. In some other embodiments, a plurality of user identifiers in a group of timing correspondences are sorted in reverse time order of viewing timestamps.

Referring to FIG. 4, for the same target video, that is, a video i, a group of timing correspondences 43 corresponding to the video i is generated after user accounts that have viewed the video i are sorted according to watch timestamps. Similarly, a corresponding timing correspondence is generated for each target video, and a total of n groups of timing correspondences are generated. i is an integer less than or equal to n.

In this embodiment of this application, the n groups of timing correspondences are considered as one document set, and each group of timing correspondences is considered as one document. For the context in each document, a degree of association between user identifiers with a short distance from each other is higher than a degree of association between user identifiers with a long distance from each other.

Step 303. Obtain a word-embedding matrix by performing mapping on the n groups of timing correspondences in a word vector mapping manner, the word-embedding matrix including a word vector corresponding to each user account.

The word-embedding matrix is obtained by performing mapping on the n groups of timing correspondences in the word vector mapping manner. Schematically, the word vector mapping manner may be a word2vector mapping manner.

Optionally, word2vector is implemented by using a neural network model. The neural network model may be a continuous bag-of words (CBOW) model or a Skip-Gram model. An example in which word2vector uses a CBOW model is used for describing this embodiment. Optionally, the CBOW model is a neural network model with at least three layers, including an input layer, at least one hidden layer, and an output layer (Softmax layer). Optionally, the output layer uses an NCE loss function as a loss function. A word-embedding matrix is obtained after the server inputs the n groups of timing correspondences into the neural network model.

The word-embedding matrix includes a word vector corresponding to each user account. Each word vector is an x-dimension vector. A quantity of dimensions of the x-dimension vector is less than the quantity m of target videos. Optionally, x is much less than m. For example, m is on a level of millions, and x is on a level of hundreds.

Step 304. Train the word-embedding matrix by using an NCE loss function.

An initial word-embedding matrix may not necessarily accurately represent a degree of similarity between user accounts from the perspective of video watching. Consequently, the server trains the word-embedding matrix by using an NCE loss function, the loss function being used for digging out a similarity relationship between the user accounts according to a degree of similarity between watch histories.

Optionally, the server stores a first termination threshold. The first termination threshold is used for indicating a critical termination value during the training of the word-embedding matrix. After an $i^{th}$ round of iterative training, the server calculates whether a function value of the NCE loss function is less than the first termination threshold. When the function value of the NCE loss function is not less than the first termination threshold, an error between the function value and the first termination threshold is calculated, and an $(i+1)^{th}$ round of iterative training is performed according to an error back propagation algorithm. The process is repeated until the function value of the NCE loss function is less than the termination threshold.

The NCE loss function is used for digging out an implicit degree of similarity between user accounts from the perspective of video watching according to a degree of similarity between watch histories of users.

Step 305. Determine a word vector corresponding to the user account in the word-embedding matrix as a user feature of the user account in a case that a function value of the NCE loss function is less than a first termination threshold.

After repeated training, the server determines that the training of the word-embedding matrix is ended when the function value of the NCE loss function is less than the termination threshold. Next, the server determines a word vector corresponding to each user account in the trained word-embedding matrix as a user feature of the user account.

At this point, the server generates a user feature for each of n user accounts. The user feature may be used for training a candidate generation model.

The following is a training stage of the candidate generation model.

Step 306. Acquire a video identifier in a history record, and generate a video feature according to the video identifier, the history record being at least one of a watch history record and a search history record of the user account.

During the training of the candidate generation model, a training sample including an input includes at least one group of a user feature and a video feature that correspond to a user account. For a specific user account, a user feature of the user account is generated by using step 301 to step 306. A video feature of the user account is generated by using a video identifier in a history record of the user account, the history record being at least one of a watch history record and a search history record of the user account.

In some embodiments, an example in which a video feature is generated according to a watch history record of a user account is used. After video identifiers are sorted according to an order of watch time of the user account, one vector spliced by a plurality of video identifiers is formed, and the vector is determined as the video feature of the user account.

In some other embodiments, the server generates a video feature in a manner similar to the manner of generating a user feature. That is, the server acquires video viewing history records of user accounts, and obtains a word-embedding matrix by performing mapping on the video viewing history records of the user accounts in a word vector mapping manner, the word-embedding matrix including word vectors of target videos. The server trains the word-embedding matrix by using an NCE loss function to obtain the trained word-embedding matrix; and determines word vectors in the trained word-embedding matrix as video features of the target videos.

In this embodiment, a specific generation manner of a video feature is not limited.

Step 307. Input the user feature and the video feature as sample features into the candidate generation model for training, to obtain the trained candidate generation model.

The server inputs user features and video features of a plurality of user accounts as sample features into the candidate generation model for training to obtain the trained candidate generation model.

The trained candidate generation model is used for outputting watch probabilities of videos in a video library according to the inputted user feature.

During video recommendation, that is, during actual use of the candidate generation model, the server extracts, by using step 301 to step 305, a user feature of a user account that requires recommendation. The user feature is inputted into the candidate generation model to obtain probabilities that the user account watches videos in a video library. Optionally, top n videos are determined as videos that the user account may be interested in, that is, videos to be recommended to the user account.

In summary, according to the user feature generation method provided in this embodiment, n groups of timing correspondences between a target video and a user account are acquired, a word-embedding matrix is obtained by performing mapping on the n groups of timing correspondences, the word-embedding matrix is trained by using a loss function, and a word vector corresponding to a user account in the trained word-embedding matrix is determined as a user feature of the user account. According to the technical solution of this application, a user feature is extracted based on a history record of a user. The history record may be at least one of a watch history record and a search history record. All the historical data is data automatically generated in a video system. Provided that the user normally uses the video system, the video system continually generates and updates such data without depending on another data source. Therefore, the problem that a valid user feature cannot be generated for a user with blank, incomplete or incorrect attribute information by using a method in the related art can be resolved, and a relatively accurate user feature can be generated for a user using the video system. In addition, the user feature can fully reflect a feature of each user account from the perspective of video watching and is appropriate for use as an input parameter of a neural network model related to a video recommendation system.

According to the user feature generation method provided in this embodiment, a word-embedding matrix is obtained by performing mapping on n groups of timing correspondence in a word vector mapping manner, and the word-embedding matrix is trained by using an NCE loss function. An implicit relationship between user accounts that like watching the same or similar videos can be dug out. Therefore, an implicit similarity relationship between user accounts from the perspective of video watching is fully dug out, thereby improving the accuracy of an input of a candidate generation model.

In an optional embodiment based on FIG. 3, the server further provides an evaluation mechanism for evaluating the trained candidate generation model. The foregoing step 307 is alternatively implemented as steps in the following.

Step 307*a*. Divide the user features and the video features into h+k groups of data sets, the h+k groups of data sets including h groups of training sets and k groups of assessment sets.

After the server generates a plurality of groups of user features and video features according to video watch history records of user accounts, the server divides the plurality of groups of user features and video features into h+k groups of data sets. Both h and k are positive integers. Optionally, the server selects h groups of data sets in the h+k groups of data sets as training sets and selects k groups of data sets as assessment sets.

Step 307*b*. Input the user feature and the video feature in the h groups of data sets as the sample features into the candidate generation model for training, to obtain the trained candidate generation model.

The server inputs the user feature and the video feature in the h groups of training sets as sample features into the candidate generation model to perform a plurality of rounds of iterative training on the candidate generation model by using an error back propagation algorithm. When an error is less than a termination threshold of the model, the server obtains the trained candidate generation model. The termination threshold of the model is used for indicating a critical termination value during the training of the candidate generation model.

For example, when a degree of matching between a predicted video result obtained after a user feature is inputted and an actual video feature reaches above 98% (the error is less than 2%), it is determined that the trained candidate generation model is obtained.

Step 307*c*. Evaluate a recall rate of the trained candidate generation model by using the k groups of assessment set.

When the trained candidate generation model is evaluated by using the k groups of assessment sets, the generation method and training process of a user feature are identical to those of a video feature. The server inputs the user feature into the trained candidate generation model, and the trained candidate generation model outputs probabilities that a user watches videos (probabilities of interest), and determines top n videos in an order of watch probabilities as a candidate recommendation set, n being a positive integer.

Next, the server checks whether videos in the candidate recommendation set fall into a historical video set of videos watched by a user account (that is, videos with a video feature of the user account). If the videos fall into the historical video set, it is considered that the recall succeeds. If the videos do not fall into the historical video set, the recall fails. The server calculates recall rates of all user accounts in the assessment sets as evaluation parameters of the candidate generation model.

Step 307d. Determine the trained candidate generation model as a to-be-used candidate generation model in a case that the recall rate of the trained candidate generation model reaches a second termination threshold.

The server checks whether the recall rate of the candidate generation model is greater than the second termination threshold. If the recall rate is greater than the second termination threshold, the trained candidate generation model is determined as a to-be-used candidate generation model. If the recall rate is less than the second termination threshold, the trained candidate generation model is determined as an unqualified candidate generation model, and a training set is reselected to continue with the training.

The second termination threshold is a critical termination value used for indicating that the candidate generation model is a model meeting a launch and use condition.

In summary, according to the method provided in this embodiment, a trained candidate generation model is evaluated by using k groups of assessment sets, and the trained candidate generation model is determined as a to-be-used candidate generation model until a recall rate of the trained candidate generation model is greater than the second termination threshold, so that the performance of the trained candidate generation model after being launched to a production system is therefore ensured.

Figure 6:
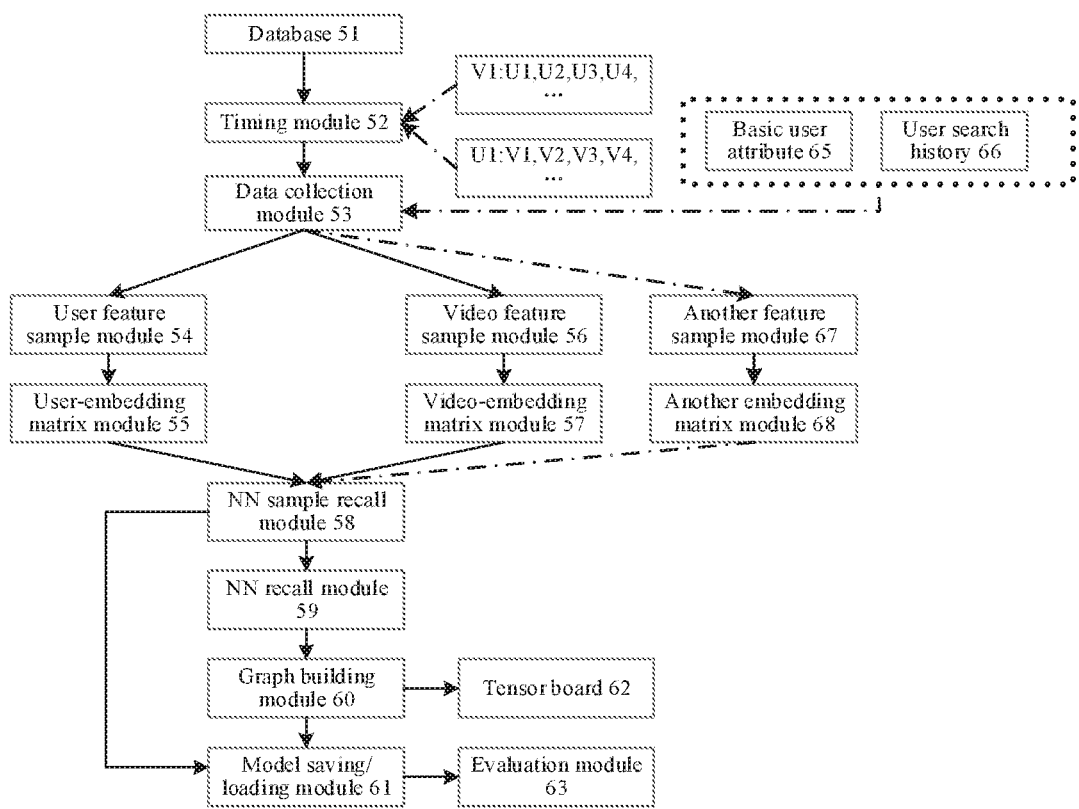
FIG. 6 is a schematic diagram of an interface during the implementation of a user feature generation method according to another exemplary embodiment of this application.

The user feature may be used for training a DNN-based candidate generation model. In a schematic example shown in FIG. 6, a candidate generation model may be implemented by using a machine learning architecture Tensor-Flow. A timing module 52 is responsible for extracting video-watch flow records of user accounts from a database 51. The database 51 may be a database used for storing the video-watch flow records, for example, a log system Boss. A data collection module 53 extracts video-watch history records of user accounts from the video-watch flow record. In one aspect, the data collection module 53 submits the video-watch history records of the user accounts to a user account sample module 54 and a user-embedding matrix module 55 to generate user features. In another aspect, the data collection module 53 submits the video-watch history records of the user accounts to a video feature sample module 56 and a video-embedding matrix module 57 to generate video features, and the user features and video features of the user accounts are further submitted to an NN sample recall module 58. The NN sample recall module 58 is configured to splice the user features and the video features of the user accounts, for example, splice a user feature and a video feature of the same user account into a group of sample features. A plurality of groups of sample features are formed and used for being inputted into a DNN provided by an NN recall module 59 for training, to obtain a candidate generation model.

Optionally, a graph building module 60 is responsible for reporting an intermediate result during the training of the DNN to a tensor board 62. The server finishes the training of the DNN according to the intermediate result obtained by the tensor board 62. A model obtained after the training of the DNN is completed is the candidate generation model. A model saving/loading module 61 is configured to save the trained candidate generation model. The candidate generation model is used for performing model evaluation on a user candidate set list.

Optionally, in addition to the user feature and the video feature, the data collection module 53 may further collect attribute features such as a basic user attribute 65 and a user search history 66. Such attribute features are used by another attribute sample module 67 and another embedding matrix module 68 to generate features of the user in other dimensions. Such features in other dimensions are also used as parameters for training the candidate generation model to train the candidate generation model.

To evaluate the accuracy of the candidate generation model, in this embodiment of this application, an evaluation module 63 is designed for the candidate generation model. Schematically, sample features are divided into N+1 historical partitions. The candidate generation model is trained by using data of the first N historical partitions and the trained candidate generation model is saved in a file of the trained model. Data of an $(N+1)^{th}$ historical partition is used for evaluating the accuracy of the candidate generation model. During the training and evaluation, the generation process of a user feature needs to be identical with that of a video feature. N is a positive integer.

In some embodiments, a recall rate indicator is used for measuring the recall capability of the candidate generation model. Several users are drawn randomly from the $(N+1)^{th}$ partition, and a user feature of each user is inputted into the candidate generation model. Top k results are then extracted from output results of an output layer of the candidate generation model as a candidate set. If videos that the users have actually watched fall into the range of top k, it is considered that the recall succeeds, or if not, the recall fails. All predicted results of the users are then summarized, and finally an overall recall rate is obtained. k is a positive integer.

As shown in Table 1 below, a sample of a training set has a separate corresponding user set and video set. If a user feature set in an assessment set is not in the training set, the user feature set is considered to be "out of vocabulary" (OOV). If a video feature set in the assessment set is not in the training set, the video feature set is considered to be OOV. It can be seen from an experimental result that when the value of k decreases, a recall rate drops correspondingly. When an amount of training sample data is increased, the recall rate rises correspondingly. An absolute recall rate indicates a recall rate of an entire set. A relative recall rate indicates a recall rate of a non-OOV set.

TABLE 1

| Training set hour partition quantity | Assessment set user quantity | Assessment set video quantity | Top k | User quantity OOV | Video quantity OOV | Hit quantity | Absolute recall rate | Relative recall rate |
|---|---|---|---|---|---|---|---|---|
| 6 | 2000 | 17070 | 1000 | 1204 | 678 | 370 | 18.50% | 46.50% |
| 6 | 2000 | 16909 | 500 | 1265 | 610 | 250 | 12.50% | 34.00% |
| 10 | 2000 | 19357 | 500 | 1315 | 238 | 444 | 22.20% | 64.80% |
| 10 | 2000 | 19412 | 200 | 1326 | 205 | 310 | 15.50% | 46.00% |

In a schematic example, the technical solution provided by this application may be applied to a new focus channel of video playback. A recommendation result of the channel is mainly formed by an algorithmic recommendation part and a manual intervention part. The algorithmic recommendation part is formed by several algorithm recall modules. According to this technical solution, a user-to-item (u2i) recall module is added to the original recall modules. The recall module generates a video recommendation list for each user through a DNN model. In this way, recommendation results of the DNN recall module and other existing recall modules are combined together, undergo personalized sorting, and are finally presented to a user. The main function of the u2i recall module is to find out hundreds of videos from a massive number of videos by using a deep learning method, and use the hundreds of videos as candidate videos for recommendation in the first phase.

In a candidate generation model obtained by deep learning in this technical solution, a user feature is generated through a video-playback flow record, thereby reducing the costs of generating a user feature. In A/B testing, the inventor adds a candidate u2i recall module generated according to this technical solution in a treatment bucket, and compares the effect of the treatment bucket with that of a control bucket. An experimental result indicates that the effect of the treatment bucket is generally superior to that of the control bucket, and there is an about 1.25% increase in average visit view (VV). In the treatment bucket, the inventor compares the effect of the experimental module and the effect of a UCF algorithm module. It is found through comparison that the algorithm module is apparently superior to the UCF algorithm module in the average VV indicator.

Figure 7:
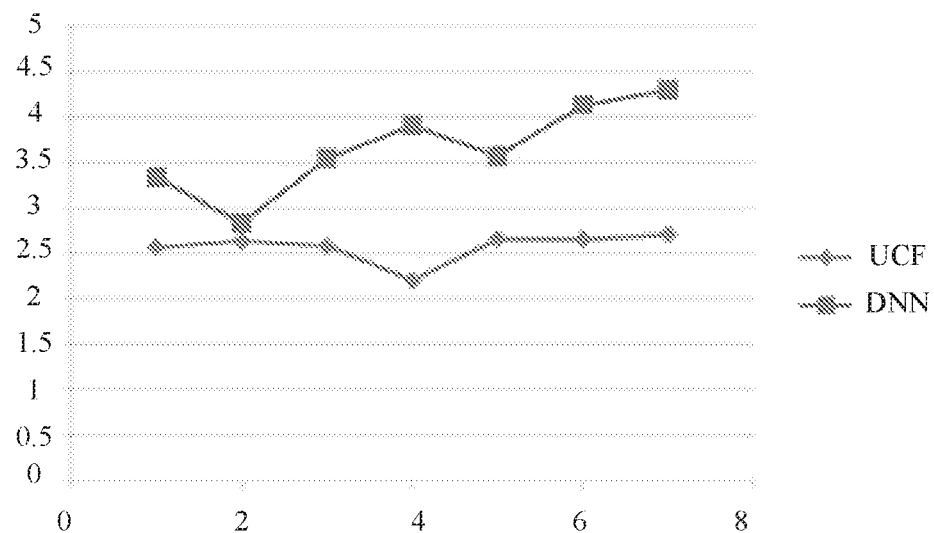
FIG. 7 is a schematic diagram of a comparison between a user feature generation method and a user collaborative filter (UCF) recommendation method according to another exemplary embodiment of this application.

The inventor compares the effect of this technical solution with that of the UCF algorithm module in the same treatment bucket. The result is shown in FIG. 7. The horizontal axis represents a quantity of days during which the experiment has been launched, and the vertical axis is the average VV indicator of a module. It can be seen that the effect of this technical solution is superior to that of the UCF algorithm module.

Figure 5:
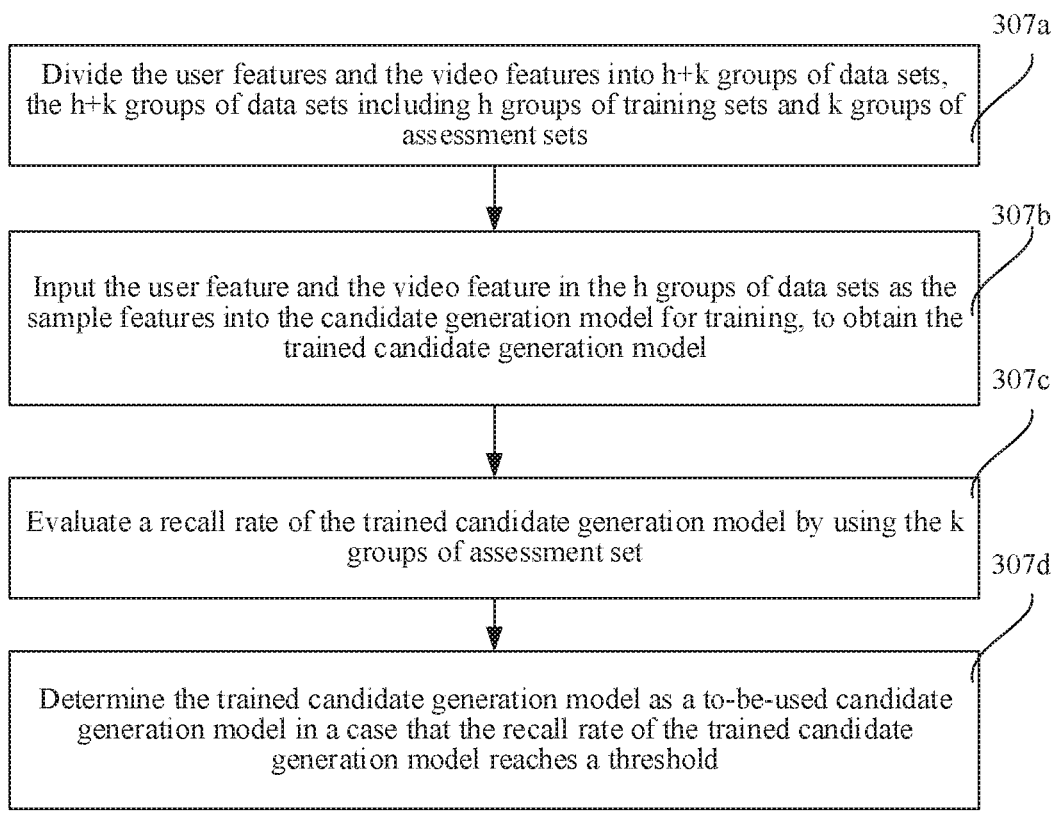
FIG. 5 is a flowchart of a user feature generation method according to another exemplary embodiment of this application.

FIG. 2, FIG. 3, and FIG. 5 are schematic flowcharts of a user feature generation method in one embodiment. It is to be understood that although the steps in the flowcharts of FIG. 2, FIG. 3, and FIG. 5 are sequentially displayed in accordance with instructions of arrows, such steps are not necessarily performed sequentially in the order indicated by the arrows. Unless otherwise explicitly specified in this application, execution of the steps is not strictly limited in terms of order, and the steps may be performed in other sequences. Moreover, at least some of the steps in FIG. 2, FIG. 3, and FIG. 5 may include a plurality of sub-steps or a plurality of stages. These sub-steps or stages are not necessarily performed at the same moment, but may be performed at different times. These sub-steps or stages are not necessarily executed sequentially, but may be performed with at least one part of the other steps or sub-steps of other steps or stages in turn. It is to be understood that the method in FIG. 2, FIG. 3, and FIG. 5 may be separately performed by an electronic device such as a server or a terminal, or may be performed by a terminal and a server collaboratively.

Apparatus embodiments of this application are described below. Reference may be made to the foregoing method embodiments in a one-to-one correspondence to the apparatus embodiments for technical details that are not described in the apparatus embodiments.

Figure 8:
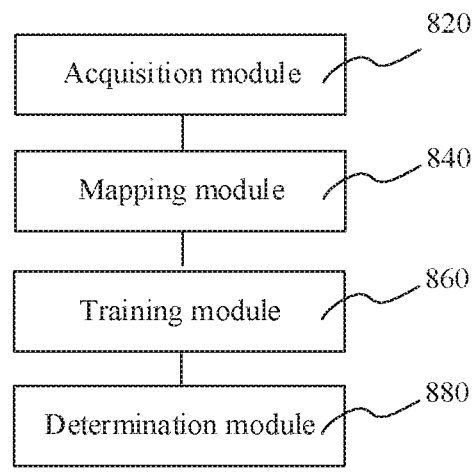
FIG. 8 is a block diagram of a user feature generation apparatus according to an exemplary embodiment of this application.

FIG. 8 is a block diagram of a user feature generation apparatus according to an exemplary embodiment of this application. The generation apparatus may be implemented as an entire server or a part of a server by using software, hardware or a combination thereof. The apparatus includes:

an acquisition module 820, configured to acquire n groups of timing correspondences between a target video and a user account, each group of timing correspondences including user accounts that have viewed the target video, the user accounts being sorted according to viewing timestamps, and n being a positive integer;

a mapping module 840, configured to obtain a word-embedding matrix by performing mapping on then groups of timing correspondences, the word-embedding matrix including a word vector corresponding to each user account;

a training module 860, configured to train the word-embedding matrix by using a loss function, the loss function being used for digging out a similarity relationship between the user accounts according to a degree of similarity between watch histories; and a determination module 880, configured to determine a word vector corresponding to the user account in the trained word-embedding matrix as a user feature of the user account.

In an optional embodiment, the training module 860 is configured to train the word-embedding matrix by using an NCE loss function.

In an optional embodiment, the determination module 880 is configured to determine the word vector corresponding to the user account in the word-embedding matrix as the user feature of the user account in a case that a function value of the NCE loss function is less than a first termination threshold.

In an optional embodiment, the mapping module 840 is configured to obtain the word-embedding matrix by performing mapping on the n groups of timing correspondences in a word vector mapping manner.

Figure 9:
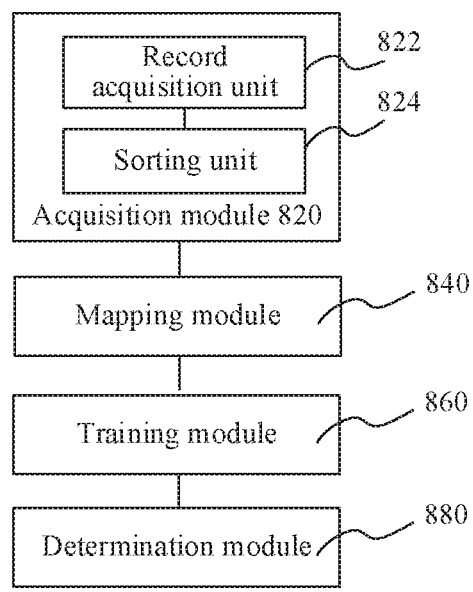
FIG. 9 is a block diagram of a user feature generation apparatus according to another exemplary embodiment of this application.

In an optional embodiment, as shown in FIG. 9, the acquisition module 820 includes a record acquisition unit 822 and a sorting unit 824.

the record acquisition unit 822 being configured to acquire video viewing history records of m user accounts, the video viewing history records including a video identifier and viewing timestamps of a target video, m being a positive integer, die target video being at least one of a watched video and a searched-for video of a user; and the sorting unit 824 being configured to generate, for each target video in the video viewing history records after user accounts that have viewed the target video are sorted according to corresponding viewing timestamps, timing correspondences between the target video and the user accounts.

Figure 10:
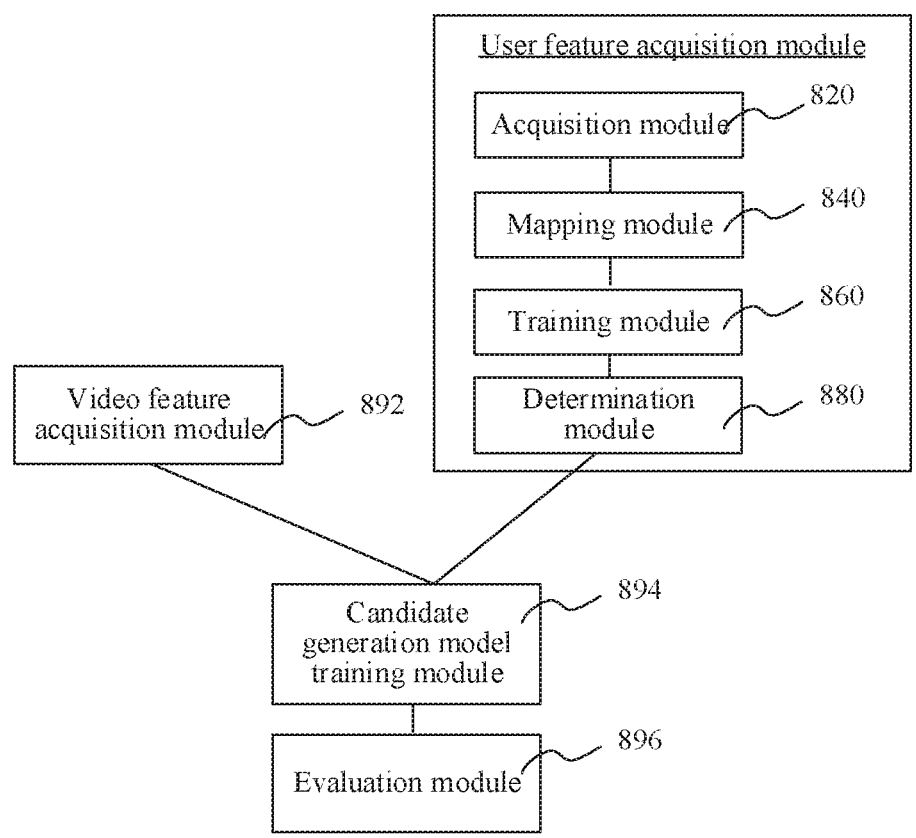
FIG. 10 is a block diagram of a user feature generation apparatus according to an exemplary embodiment of this application.

In an optional embodiment, the apparatus further includes a video feature acquisition module 892 and a candidate generation model training module 894, as shown in FIG. 10.

The video feature acquisition module 892 is configured to acquire a video identifier in a history record as a video feature, the history record being at least one of a watch history record and a search history record of the user account; and the candidate generation model training module 894 is configured to input the user feature and the video feature as sample features into a candidate generation model for training, to obtain the trained candidate generation model, the trained candidate generation model being used for outputting watch probabilities of videos in a video library according to the inputted user feature.

In an optional embodiment the apparatus further includes an evaluation module 896, the candidate generation model training module 894 being configured to: divide the user features and the video features into h+k groups of data sets, the h+k groups of data sets including h groups of training sets and k groups of assessment sets; and input the user features and the video features in the h groups of training sets as the sample features into the candidate generation model for training, to obtain the trained candidate generation model, both h and k being positive integers; and the evaluation module 896 is configured to: evaluate a recall rate of the trained candidate generation model by using the k groups of assessment set; and determine the trained candidate generation model as a to-be-used candidate generation model in a case that the recall rate of the trained candidate generation model reaches a second termination threshold.

Figure 11:
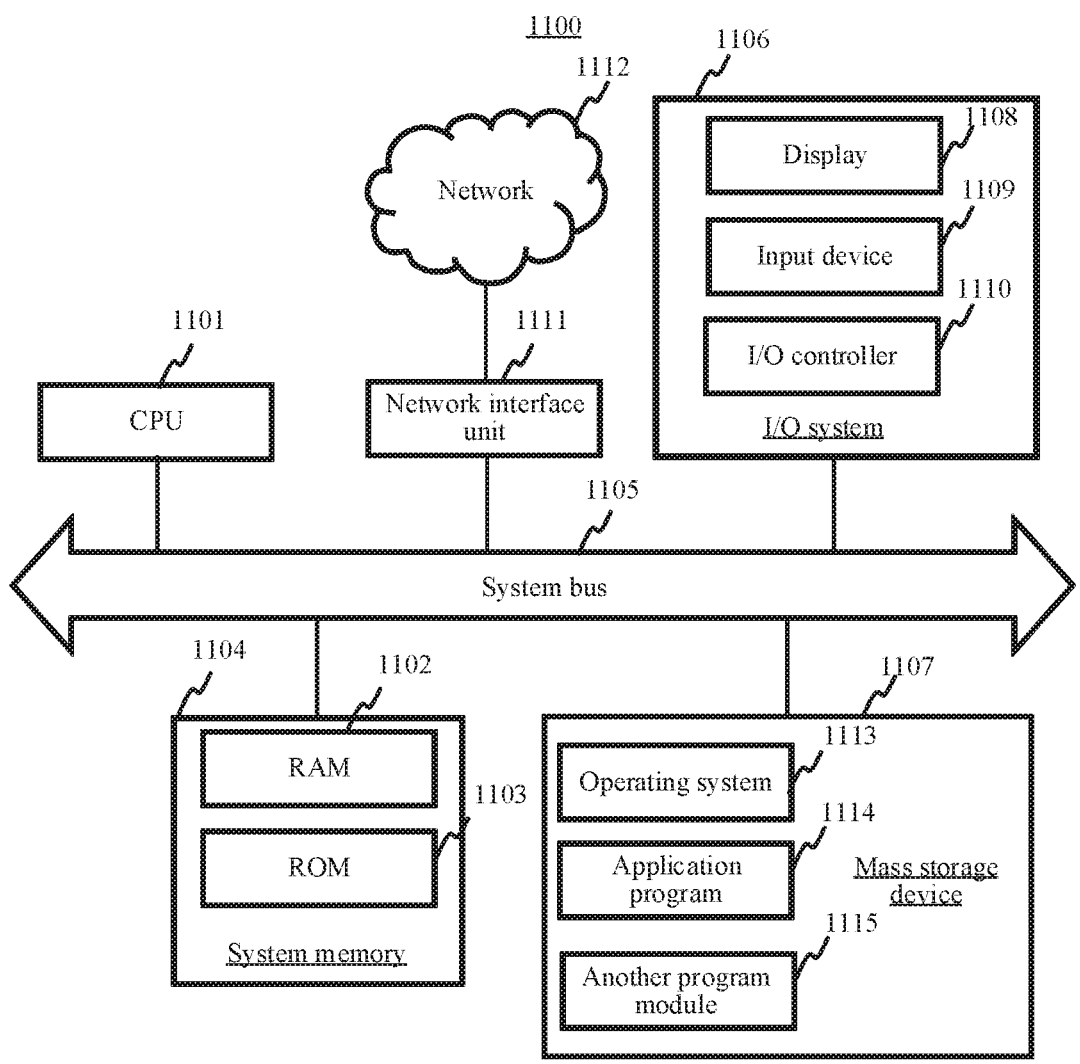
FIG. 11 is a block diagram of a server according to an exemplary embodiment of this application.

FIG. 11 shows a block diagram of a server according to an exemplary embodiment of this application. The server is configured to implement the user feature generation method on a server side provided in the foregoing embodiments. Specifically:

The server 1100 includes a central processing unit (CPU) 1101, a system memory 1104 including a random access memory (RAM) 1102 and a read-only memory (ROM) 1103, and a system bus 1105 connecting the system memory 1104 and the CPU 1101. The server 1100 further includes a basic input/output (I/O) system 1106 for helping transmit information between components in a computer, and a mass storage device 1107 configured to store an operating system 1113, an application program 1114, and another program module 1115.

The basic I/O system 1106 includes a display 1108 configured to display information and an input device 1109 such as a mouse or a keyboard that is configured for information inputting by a user. The display 1108 and the input device 1109 are both connected to the CPU 1101 by an I/O controller 1110 connected to the system bus 1105. The basic I/O system 1106 may further include the I/O controller 1110 for receiving and processing an input from a plurality of other devices such as a keyboard, a mouse or an electronic stylus. Similarly, the I/O controller 1110 further provides an output to a display screen, a printer, or another type of output device.

The mass storage device 1107 is connected to the CPU 1101 by a mass storage controller (not shown) connected to the system bus 1105. The mass storage device 1107 and an associated computer-readable medium provide non-volatile storage for the server 1100. That is, the mass storage device 1107 may include a computer-readable medium (not shown) such as a hard disk drive or a CD-ROM driver.

Without loss of generality, the non-transitory computer-readable storage medium includes volatile, non-volatile, removable, and non-removable media that store information such as computer-readable instructions, data structures, program modules, or other data and that are implemented by using any method or technology. A person of ordinary skill in the art may understand that all or some of the procedures of the methods of the foregoing embodiments may be implemented by a computer-readable instruction instructing relevant hardware. The computer-readable instruction may be stored in a non-transitory computer-readable storage medium. When the computer-readable instruction is executed, the computer-readable instruction may include the procedures of the embodiments of the foregoing methods. The non-volatile memory may include a ROM, a programmable ROM (PROM), an electrically programmable ROM (EPROM), an electrically erasable programmable ROM (EEPROM) or a flash. The volatile memory may include a RAM or an external high-speed cache. For the purpose of description instead of limitation, the RAM is available in a plurality of forms such as a static RAM (SRAM), a dynamic RAM (DRAM), a synchronous DRAM (SDRAM), a double data rate SDRAM (DDRSDRAM), an enhanced SDRAM (ESDRAM), a synchiink DRAM (SLDRAM), a Rambus direct RAM (RDRAM), a direct Rambus dynamic RAM (DRDRAM), and a Rambus dynamic RAM (RDRAM).

The system memory 1104 and the mass storage device 1107 may be general referred to as a memory.

According to various embodiments of this application, the server 1100 may further be connected, by a network such as the Internet, to a remote computer on the network and run. That is, the server 1100 may be connected to a network 1112 by using a network interface unit 1111 connected to the system bus 1105 or may be connected to another type of network or remote computer system (not shown) by using the network interface unit 1111.

The memory further includes one or more programs. The one or more programs are stored in the memory and configured to be executed by one or more processors. The one or more programs include instructions used for performing the foregoing user feature generation method.

After considering the specification and implementing the present disclosure, a person skilled in the art can readily think of other implementations of this application. This application is intended to cover any variations, uses or adaptation of this application following the general principles of this application, and includes the well-known knowledge and conventional technical means in the art and undisclosed in this application. The specification and the embodiments are merely considered as examples, and the actual scope and the spirit of this application are pointed out by the following claims.

It is to be understood that this application is not limited to the accurate structures that are described in the foregoing and that are shown in the accompanying drawings, and modifications and changes may be made without departing from the scope of this application. The scope of this application is limited by the appended claims only.

What is claimed is:

1. A user feature generation method, performed by a server having a processor and memory storing a plurality of instructions to be executed by the processor, the method comprising:

acquiring n groups of timing correspondences between target videos and corresponding user accounts, each group of timing correspondences comprising user accounts that have viewed a respective target video, the user accounts being sorted according to their corresponding viewing timestamps, n being a positive integer;

obtaining a word-embedding matrix by mapping the n groups of timing correspondences into the word-embedding matrix, the word-embedding matrix comprising a word vector corresponding to each user account;

training the word-embedding matrix by using a loss function, the loss function being used for defining a similarity relationship between the user accounts according to a degree of similarity between their respective watch histories; and determining a word vector corresponding to each user account in the trained word-embedding matrix as a user feature of the user account.

2. The method according to claim 1, wherein the training the word-embedding matrix by using a loss function comprises:

training the word-embedding matrix by using a noise-contrastive estimation (NCE) loss function.

3. The method according to claim 2, wherein the determining a word vector corresponding to each user account in the trained word-embedding matrix as a user feature of the user account comprises:

determining the word vector corresponding to each user account in the word-embedding matrix as the user feature of the user account in a case that a function value of the NCE loss function is less than a first termination threshold.

4. The method according to claim 1, wherein the obtaining a word-embedding matrix by mapping the n groups of timing correspondences into the word-embedding matrix comprises:

obtaining the word-embedding matrix by mapping the n groups of timing correspondences in a word vector mapping manner.

5. The method according to claim 1, wherein the acquiring n groups of timing correspondences between target videos and corresponding user accounts comprises:

acquiring video viewing history records of m user accounts, each video viewing history record comprising a video identifier of a target video and viewing timestamps of the target video, m being a positive integer, the target video being at least one of a watched video and a searched-for video of a user corresponding to one of the m user accounts; and generating, for each target video in the video viewing history records after the user accounts that have viewed the target video are sorted according to their corresponding viewing timestamps, timing correspondences between the target video and the user accounts.

6. The method according to claim 1, further comprising:

acquiring a video identifier of a target video in a history record, and generating a video feature according to the video identifier, the history record being at least one of a watch history record and a search history record of the target video by a user account; and training a candidate generation model using the user feature and the video feature as sample features, the trained candidate generation model being used for outputting watch probabilities of videos in a video library according to the user feature.

7. The method according to claim 6, wherein the training a candidate generation model using the user feature and the video feature as sample features comprises:

dividing the user features and the video features into h+k groups of data sets, the h+k groups of data sets comprising h groups of training sets and k groups of assessment sets, both h and k being positive integers; and inputting the user features and the video features in the h groups of training sets as the sample features into the candidate generation model, to obtain the trained candidate generation model; and the method further comprises:

evaluating a recall rate of the trained candidate generation model by using the k groups of assessment sets; and determining the trained candidate generation model as a to-be-used candidate generation model in a case that the recall rate of the trained candidate generation model reaches a second termination threshold.

8. A server comprising a processor and memory, the memory storing a plurality of instructions that, when executed by the processor, cause the processor to perform a plurality of operations including:

acquiring n groups of timing correspondences between target videos and corresponding user accounts, each group of timing correspondences comprising user accounts that have viewed a respective target video, the user accounts being sorted according to their corresponding viewing timestamps, n being a positive integer;

obtaining a word-embedding matrix by mapping the n groups of timing correspondences into the word-embedding matrix, the word-embedding matrix comprising a word vector corresponding to each user account;

training the word-embedding matrix by using a loss function, the loss function being used for defining a similarity relationship between the user accounts according to a degree of similarity between their respective watch histories; and determining a word vector corresponding to each user account in the trained word-embedding matrix as a user feature of the user account.

9. The server according to claim 8, wherein the training the word-embedding matrix by using a loss function comprises:

training the word-embedding matrix by using a noise-contrastive estimation (NCE) loss function.

10. The server according to claim 9, wherein the determining a word vector corresponding to each user account in the trained word-embedding matrix as a user feature of the user account comprises:

determining the word vector corresponding to each user account in the word-embedding matrix as the user feature of the user account in a case that a function value of the NCE loss function is less than a first termination threshold.

11. The server according to claim 8, wherein the obtaining a word-embedding matrix by mapping the n groups of timing correspondences into the word-embedding matrix comprises:

obtaining the word-embedding matrix by mapping the n groups of timing correspondences in a word vector mapping manner.

12. The server according to claim 8, wherein the acquiring n groups of timing correspondences between target videos and corresponding user accounts comprises:

acquiring video viewing history records of m user accounts, each video viewing history record comprising a video identifier of a target video and viewing timestamps of the target video, m being a positive integer, the target video being at least one of a watched video and a searched-for video of a user corresponding to one of the m user accounts; and generating, for each target video in the video viewing history records after the user accounts that have viewed the target video are sorted according to their corresponding viewing timestamps, timing correspondences between the target video and the user accounts.

13. The server according to claim 8, wherein the operations further comprise:

acquiring a video identifier of a target video in a history record, and generating a video feature according to the video identifier, the history record being at least one of a watch history record and a search history record of the target video by a user account; and training a candidate generation model using the user feature and the video feature as sample features, the trained candidate generation model being used for outputting watch probabilities of videos in a video library according to the user feature.

14. The server according to claim 13, wherein the training a candidate generation model using the user feature and the video feature as sample features comprises:

dividing the user features and the video features into h+k groups of data sets, the h+k groups of data sets comprising h groups of training sets and k groups of assessment sets, both h and k being positive integers; and inputting the user features and the video features in the h groups of training sets as the sample features into the candidate generation model, to obtain the trained candidate generation model; and the operations further comprise:

evaluating a recall rate of the trained candidate generation model by using the k groups of assessment sets; and determining the trained candidate generation model as a to-be-used candidate generation model in a case that the recall rate of the trained candidate generation model reaches a second termination threshold.

15. A non-transitory computer-readable storage medium storing a plurality of instructions that, when executed by a processor of a server, cause the server to perform a plurality of operations including:

acquiring n groups of timing correspondences between target videos and corresponding user accounts, each group of timing correspondences comprising user accounts that have viewed a respective target video, the user accounts being sorted according to their corresponding viewing timestamps, n being a positive integer;

obtaining a word-embedding matrix by mapping the n groups of timing correspondences into the word-embedding matrix, the word-embedding matrix comprising a word vector corresponding to each user account;

training the word-embedding matrix by using a loss function, the loss function being used for defining a similarity relationship between the user accounts according to a degree of similarity between their respective watch histories; and determining a word vector corresponding to each user account in the trained word-embedding matrix as a user feature of the user account.

16. The non-transitory computer-readable storage medium according to claim 15, wherein the training the word-embedding matrix by using a loss function comprises:

training the word-embedding matrix by using a noise-contrastive estimation (NCE) loss function.

17. The non-transitory computer-readable storage medium according to claim 16, wherein the determining a word vector corresponding to each user account in the trained word-embedding matrix as a user feature of the user account comprises:

determining the word vector corresponding to each user account in the word-embedding matrix as the user feature of the user account in a case that a function value of the NCE loss function is less than a first termination threshold.

18. The non-transitory computer-readable storage medium according to claim 15, wherein the obtaining a word-embedding matrix by mapping the n groups of timing correspondences into the word-embedding matrix comprises:

obtaining the word-embedding matrix by mapping the n groups of timing correspondences in a word vector mapping manner.

19. The non-transitory computer-readable storage medium according to claim 15, wherein the acquiring n groups of timing correspondences between target videos and corresponding user accounts comprises:

acquiring video viewing history records of m user accounts, each video viewing history record comprising a video identifier of a target video and viewing timestamps of the target video, m being a positive integer, the target video being at least one of a watched video and a searched-for video of a user corresponding to one of the m user accounts; and generating, for each target video in the video viewing history records after the user accounts that have viewed the target video are sorted according to their corresponding viewing timestamps, timing correspondences between the target video and the user accounts.

20. The non-transitory computer-readable storage medium according to claim 15, wherein the operations further comprise:

acquiring a video identifier of a target video in a history record, and generating a video feature according to the video identifier, the history record being at least one of a watch history record and a search history record of the target video by a user account; and training a candidate generation model using the user feature and the video feature as sample features, the trained candidate generation model being used for outputting watch probabilities of videos in a video library according to the user feature.

* * * * *